UNITED STATES PATENT OFFICE.

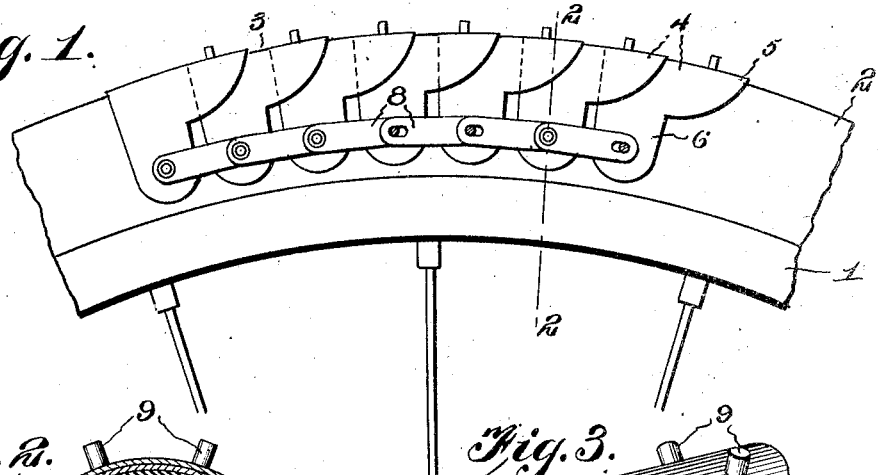
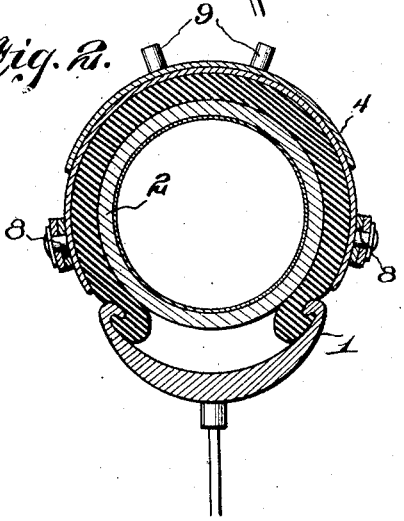
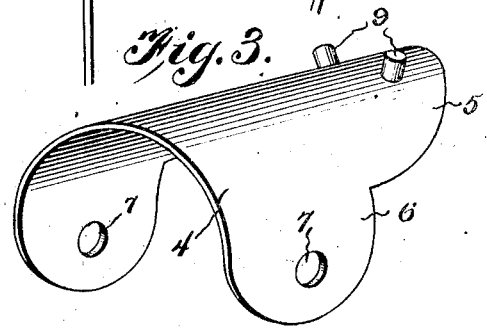
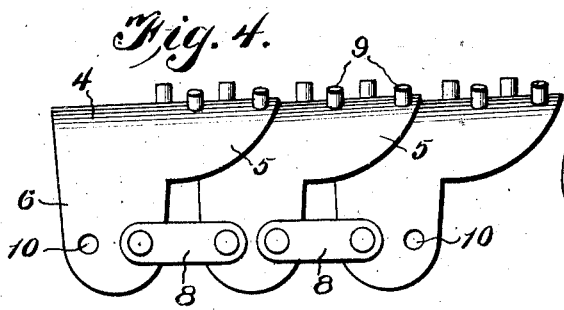
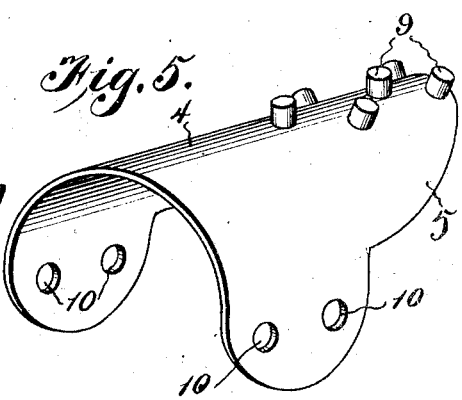

WILLIAM A. MIX, OF WALLA WALLA, WASHINGTON.

TIRE-ARMOR.

No. 905,555.  Specification of Letters Patent.  Patented Dec. 1, 1908.

Application filed October 14, 1907. Serial No. 397,406.

*To all whom it may concern:*

Be it known that I, WILLIAM A. MIX, a citizen of the United States, residing at Walla Walla, in the county of Walla Walla and State of Washington, have invented certain new and useful Improvements in Tire-Armors; and I do declare the following to be a full, clear, and exact description of the invention, such as will enable others skilled in the art to which it appertains to make and use the same.

This invention has relation to new and useful improvements in a shoe or armor construction adapted to be applied on automobile or bicycle tires.

The object of the invention is to provide an armor of this class which will protect the tire against puncture, and prevent the wheels to which the same is applied from slipping or skidding in passing over smooth or wet surfaces, the plates comprising the armor being of such construction and so arranged in position as to not affect the resiliency of the tire in the slightest degree.

With the foregoing and other objects in view, it will readily appear as the nature of the invention is better understood, the invention consists of certain novel features of construction, combination and arrangement of parts, illustrated in the drawings and pointed out in the appended claim.

In the accompanying drawings,—Figure 1 is a side elevation of a section of a bicycle wheel showing the application of the invention; Fig. 2 is a transverse section taken on the line 2—2 of Fig. 1; Fig. 3 is a detail perspective view of one of the plates comprising the shoe or armor; Fig. 4 is a view in side elevation of a series of the plates comprising the shoe or armor showing the construction, preferably employed when the invention is to be applied to an automobile tire; Fig. 5 is a detail perspective view of one of the plates shown in Fig. 5.

Referring to the drawings, which are for illustrative purposes only, and, therefore, are not drawn to any particular scale, 1 indicates a vehicle wheel, and 2 a pneumatic tire applied thereon, on which is arranged a shoe or armor 3, to prevent puncturing of the tire and to eliminate liability of skidding or sliding when the wheel is passing over smooth or wet surfaces. The armor comprises a plurality of overlapping plates 4, of spring steel, of preferably semi-circular form in cross section, so as to fit the outside surface of the tire in a radial position thereon. Each of said plates is extended longitudinally at its middle or central portion to provide a lip 5, and said plates are so arranged in position on the tire as to cause their lips to overlap portions of the adjacent plates. This overlapping feature of the plates constitutes a double covering or armor for the tire and doubly insures against puncture. Each of said plates is provided at opposite sides with inwardly extending clamping portions 6 which are curved inwardly throughout their lengths to closely fit the tire, the inner ends of the clamping portions projecting inwardly beyond the outer half of the tire to points adjacent to the wheel rim and exerting pressure upon the tire to hold the armor against circumferential displacement thereon and the individual plates comprising the armor against outward radial displacement while permitting relative circumferential rocking motion of the plates to permit them to follow the tire as the same is depressed in passing over a surface in order to preserve the maximum resiliency of the tire.

In carrying out the invention, the outer ends of the clamping portions 6 of the plates 4 are provided with central apertures 7 for the reception of rivets 8 or other suitable fastening devices, to which are connected the longitudinal slotted ends of connecting links or bars 8 for connecting the plates together. Each of said plates is also provided with a plurality of outwardly extending brads or extensions 9. When the invention is to be used in connection with bicycle tires, each of the plates is provided with two of these brads or extensions, one being arranged slightly to each side of its medial line. By arranging the brads in this manner, skidding or slipping of the wheels when making short turns is guarded against.

When the invention is to be applied to automobile tires, the clamping portions 6 of the plates are apertured at two points, as at 10, to receive the ends of the connecting links or bars, such construction being employed to add greater strength to the shoe or armor. Also, in this case, the lip portions of the plates are provided with a plurality, preferably five or six, of brads or extensions.

It is to be understood that when the invention is to be applied to an automobile tire the plates are to be made considerably larger.

From the foregoing description taken in connection with the drawings, it is thought that the construction and operation of the invention will be readily comprehended without necessitating a more extended explanation.

Having described my invention, what I claim as new and desire to secure by Letters-Patent, is:

In combination with a vehicle wheel, an armor for tires embracing a plurality of spring metal anti-slipping plates adapted to be arranged over the tread portion of the tire, each of the plates having a central lip produced at one end of its tread portion to overlap a corresponding portion of the adjacent plate and being formed at opposite side edges with inwardly extending tire clamping portions which are curved inwardly throughout their entire lengths to closely fit the tire, the inner ends of said portions projecting inwardly beyond the outer half of the tire to points adjacent to the wheel rim and exerting pressure upon the tire to hold the armor against circumferential displacement thereon and the individual plates comprising the armor against outward radial displacement while at the same time permitting relative circumferential rocking motion of said plates and connecting links for connecting the clamping portions of the plates.

In testimony whereof I have hereunto set my hand in presence of two subscribing witnesses.

WILLIAM A. MIX.

Witnesses:
T. P. GOSE,
ARTHUR I. MOULTON.